Dec. 7, 1948.    L. H. MATTHIAS    2,455,690
ELECTROMAGNET WITH PIVOTALLY MOUNTED ARMATURE
Filed Sept. 24, 1945    2 Sheets-Sheet 1

TILT OF ARMATURE IN RELATION TO
TORQUE OF RETURN SPRING

LYNN H. MATTHIAS  INVENTOR

BY Walter S. Pfeifer
ATTORNEY

Dec. 7, 1948.                    L. H. MATTHIAS                    2,455,690
              ELECTROMAGNET WITH PIVOTALLY MOUNTED ARMATURE
Filed Sept. 24, 1945                                   2 Sheets—Sheet 2
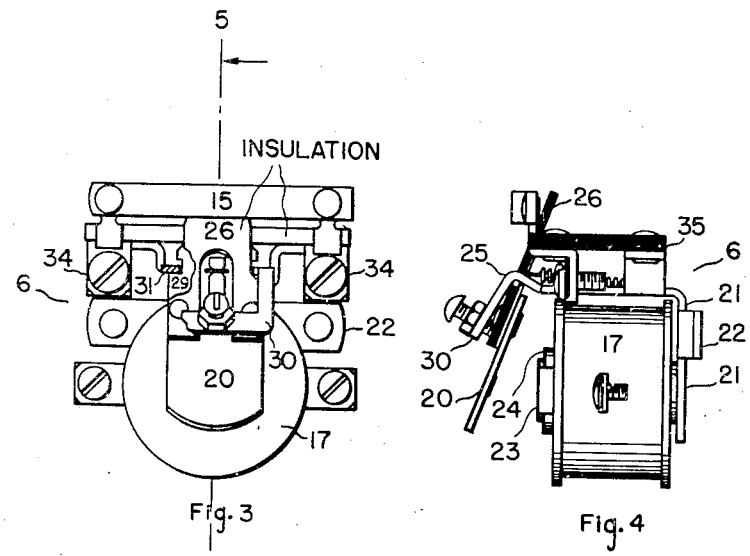
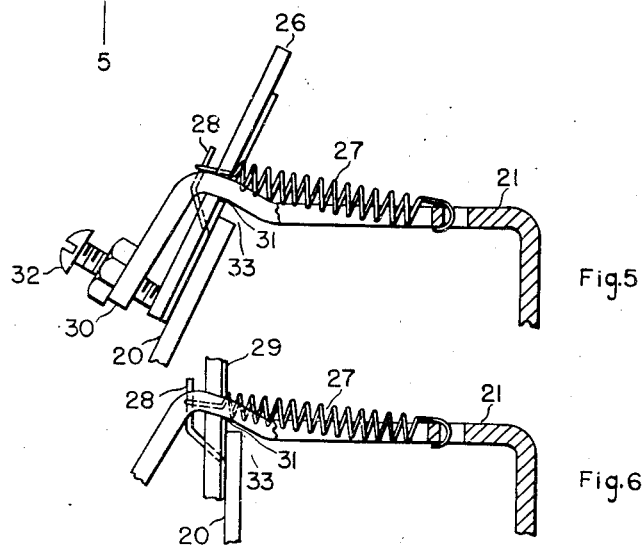
LYNN H. MATTHIAS  *INVENTOR.*
BY *Walter S. Pfeifer*
                    ATTORNEY Patented Dec. 7, 1948

2,455,690

UNITED STATES PATENT OFFICE 2,455,690

ELECTROMAGNET WITH PIVOTALLY MOUNTED ARMATURE

Lynn H. Matthias, Fox Point, Wis., assignor to Allen-Bradley Company, Milwaukee, Wis., a corporation of Wisconsin Application September 24, 1945, Serial No. 618,307

2 Claims. (Cl. 175—336)

1

The present invention relates to an electrical switch operated by an electromagnet and concerns in particular a switch which automatically controls a circuit of a motor during the starting cycle of the motor.

My invention is of particular advantage when used to control the starting circuit of a single phase motor of the capacitor start type. In this particular instance my device controls the effect of the starting winding by utilizing the voltage variations of an electrical circuit in the motor.

It is the general object of my invention to secure an electromagnetic device in which the armature will move to its closed position only at a comparatively high voltage and will remain in the closed position down to a very low voltage. This characteristic when obtainable is of great advantage in the control of certain types of motors. It is a particular object of my invention to obtain an electromagnetically operated device in which the armature has a strong bias against the closing force and which bias is reduced with the armature in the closed position.

Further objects and advantages are within the scope of this invention and relate to the construction of the armature and of the field piece and which will be apparent from a consideration of the specification and drawings of the invention.

Figure 1:
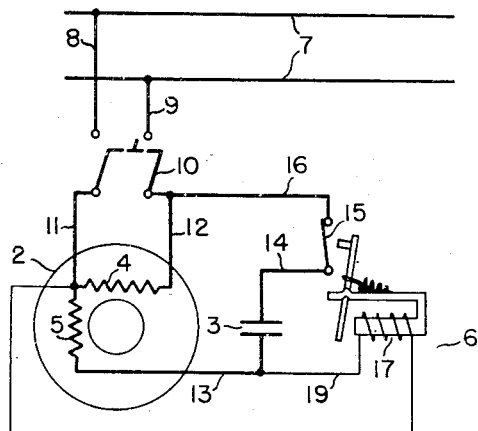
Figure 2:
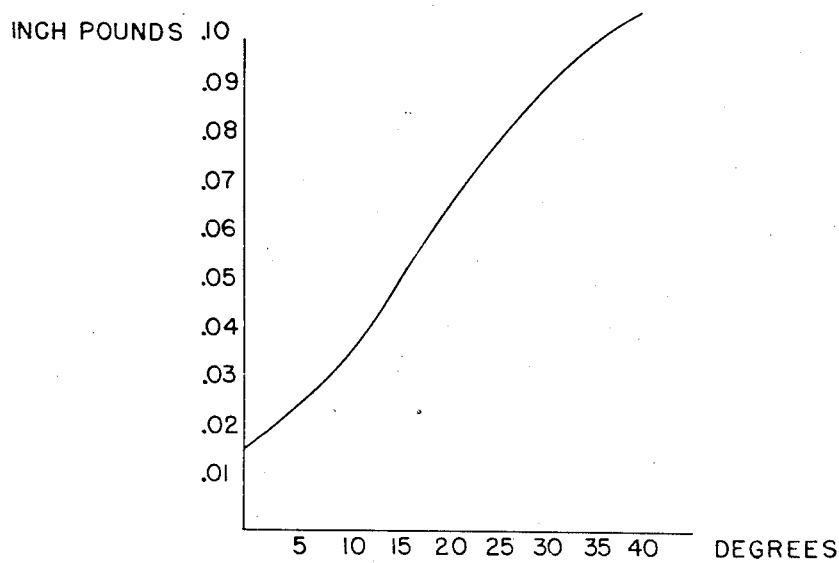

Figure 1 is a circuit diagram of a single phase type motor in which the motor is brought up to speed by a starting winding in series with a capacitor and in which diagram my invention is utilized; Figure 2 is a curve plotted of the tilt of the armature in relation to the torque of the return spring; Figure 3 is a front elevation view of my electromagnetic device; Figure 4 is a side elevation view of my device; Figure 5 is an enlarged view of a part of the armature with the bracket on which it is mounted and also shows the construction of the return spring; Figure 6 is as Figure 5 but with the armature in closed position.

With reference to Figure 1 a circuit diagram is shown of a single phase motor indicated by the numeral 2 and arranged to be started by means of capacitor 3. The running winding of the motor is indicated at 4 and a starting winding is shown at 5. The control of the motor during its starting cycle is automatically controlled by my electromagnet device indicated generally as 6, and which will be described in detail in connection with Figures 3, 4, 5 and 6. The motor is connected to the power lines 7 through conductors 8, 9, switch 10 and conductors 11 and 12. The starting winding 5 is connected to the

2 capacitor 3 through conductor 13 and this circuit is completed to the other side of the line through conductor 14, switch contact 15 and conductor 16. The relay 6 is operated to its closed position by a coil 17 which is connected across the starting winding 5 through conductors 18 and 19, the latter in turn connecting with conductor 13.

In the starting cycle of the motor, switch 10 is closed connecting running winding 4 across the power line and connecting starting winding 5 in series with the capacitor 3 across the power line. As the two windings of the motor are in a phase displacement the motor comes up to speed. The voltage over the coil 17 is comparatively low at the instant switch 10 is closed and as the motor comes up to speed this voltage increases and at a predetermined value of voltage the coil 17 causes the armature to go into closed position opening up the switch contact 15 which operation causes the starting winding 5 and the capacitor 3 to be removed from the power circuit. With the opening of the switch contact 15 the voltage across the starting winding 5 reduces to a comparatively low value. It is therefore necessary that electromagnet device 6 be so constructed to close at a predetermined high voltage and remain in closed position to a predetermined low voltage.

The construction of my electromagnet device is shown in Figures 3 and 4 and details of the return spring and bearing construction are shown in Figures 5 and 6. The latter two figures are taken as a side view on the center section line 5—5 of Figure 3 and with armature at bearing shown in full. The device in general is referred to by the numeral 6 and includes an armature 20 pivotally mounted on the field piece 21. Ears 22 extend sidewise from the field piece and provide means for mounting the same. Included with the field piece is the core 23 which extends through the coil 17 and has embedded in it a shading coil 24 to cause the armature 20 to seat properly and to reduce the noise attendant in an alternating current magnet. Extending in a forward direction the field piece 21 provides a return path for the magnetic flux and also in its offset portions 25 provides bearings for the armature. A tail piece 26 of insulation material attached to the armature 20 causes the switch contact 15 which is biased to the closed position to open when the armature is in its attracted position. A return spring 27 attached to armature and to the field piece as shown causes the armature to be biased outwardly to its open position. The attachment of the return spring to the armature is on an extension 28 of a metal plate 29 made of Phosphor bronze which plate together with tail piece 26 is riveted to the armature 20. The Phosphor bronze plate 29 has a central portion removed and bears on the offset portions 25 of the field piece 21 as indicated at 31. The forward end of the field piece forms a bracket 30 on which is adjusting screw 32 for varying the air gap between the armature 20 and the core 23 with the armature in its open position. In Figure 3 a part of bracket 30 is removed and also part of tail piece 26 is removed to show one of the two bearings 31 and the plate 29.

The air gap at the bearing surface 31 is indicated at 33 and its proportions in the open and closed position of the armature are shown in Figures 5 and 6.

Terminals 34 as shown in Figure 3 and which are mounted on a plate of insulation 35 are for switch contact 15 and are connected to conductors 14 and 16 as shown in Figure 1.

In Figure 2 is shown the tilt of armature 20 from its sealed position plotted against torque of the return spring 27.

The sensitivity of this electromagnetic device is of very high order and is obtainable in a comparatively cheap construction. I have also secured in my invention a device in which the armature operates with a comparatively little friction on its bearings and which bearings have little wear throughout hundreds of thousands of operations. As will also be noted, the armature is easily adjustable and the device as a whole stays in adjustment throughout its long life.

Having thus described my invention in its mechanical construction and in its application to a particular type of motor control, what I claim is:

1. An electromagnet device having a field piece and an armature, said field piece of U shape formed with an offset portion adjacent the end of one leg of the U to make a bearing surface, a non-magnetic metal plate attached to said armature to swing on said bearing surface, said armature in its closed position having a surface arranged to abut the end of the other leg of the field piece, a helical spring connected between said field piece and armature to bias armature in its open position and the spring so arranged that its axis shifts towards a line joining the point of attachment of spring to field piece and the bearing point between armature and field piece and the armature, metallic plate and bearing surface so arranged that with armature in closed position an air gap exists in the magnetic circuit at the bearing of the order of mechanical clearance.

2. An electromagnet device comprising an armature to move to its closed position at high voltage and to move to open position at comparatively low voltage, a fieldpiece of U shape formed with an off-set portion adjacent the end of one leg of the U to make a bearing surface, the armature in its closed position arranged to abut the end of the other leg of the fieldpiece, said armature having a non-magnetic plate attached thereto to engage said bearing, a helical spring connected between said fieldpiece and armature to bias armature in its open position, and the spring so arranged that its axis shifts towards the line joining the point of attachment of spring to fieldpiece and the bearing point between armature and fieldpiece to cause bias of spring to be reduced to a predetermined low minimum, and said plate and fieldpiece so arranged that with armature in closed position an air gap exists in the magnetic circuit at the bearing of the order of mechanical clearance.

LYNN H. MATTHIAS.

REFERENCES CITED

The following references are of record in the file of this patent:

UNITED STATES PATENTS

| Number | Name | Date |
| --- | --- | --- |
| 1,700,041 | Grob | Jan. 22, 1929 |
| 2,360,008 | Nelsen | Oct. 10, 1944 |
| 2,390,796 | Kovalsky | Dec. 11, 1945 |

FOREIGN PATENTS

| Number | Country | Date |
| --- | --- | --- |
| 34,610 | France | Mar. 12, 1929 |